(12) United States Patent
Zhang et al.

(10) Patent No.: US 10,585,988 B2
(45) Date of Patent: Mar. 10, 2020

(54) GRAPH REPRESENTATIONS FOR IDENTIFYING A NEXT WORD

(71) Applicant: Microsoft Technology Licensing, LLC, Redmond, WA (US)

(72) Inventors: Minjia Zhang, Redmond, WA (US); Xiaodong Liu, Beijing (CN); Wenhan Wang, Redmond, WA (US); Jianfeng Gao, Woodinville, WA (US); Yuxiong He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/022,001

(22) Filed: Jun. 28, 2018

(65) Prior Publication Data

US 2019/0377792 A1   Dec. 12, 2019

Related U.S. Application Data

(60) Provisional application No. 62/682,346, filed on Jun. 8, 2018.

(51) Int. Cl.
*G06F 17/27* (2006.01)
*G06F 16/33* (2019.01)
*G06F 16/901* (2019.01)

(52) U.S. Cl.
CPC ...... *G06F 17/2785* (2013.01); *G06F 16/3347* (2019.01); *G06F 16/9024* (2019.01)

(58) Field of Classification Search
CPC ............ G06F 17/2785; G06F 16/3347; G06F 16/9024
See application file for complete search history.

(56) References Cited

U.S. PATENT DOCUMENTS

| | | | |
|---|---|---|---|
| 9,514,098 B1 * | 12/2016 | Subramanya | G06F 17/21 |
| 2012/0150532 A1 * | 6/2012 | Mirowski | G06F 17/28 704/9 |
| 2018/0082171 A1 * | 3/2018 | Merity | G06F 17/277 |

\* cited by examiner

*Primary Examiner* — Walter Yehl
(74) *Attorney, Agent, or Firm* — Schwegman Lundberg & Woessner, P.A.

(57) ABSTRACT

Systems, methods, and computer-executable instructions for approximating a softmax layer are disclosed. A small world graph that includes a plurality of nodes is constructed for a vocabulary of a natural language model. A context vector is transformed. The small world graph is searched using the transformed context vector to identify a top-K hypothesis. A distance from the context vector for each of the top-K hypothesis is determined. The distance is transformed to an original inner product space. A softmax distribution is computed for the softmax layer over the inner product space of the top-K hypothesis. The softmax layer is useful for determining a next word in a speech recognition or machine translation.

20 Claims, 9 Drawing Sheets

GRAPH REPRESENTATIONS FOR IDENTIFYING A NEXT WORD

PRIORITY CLAIM

This application claims the benefit of priority to U.S. Provisional Patent Application Ser. No. 62/682,346, filed Jun. 8, 2018, entitled "GRAPH REPRESENTATIONS FOR DECODING NEURAL LANGUAGE MODELS." The above-identified provisional application is incorporated herein by reference in its entirety.

BACKGROUND

Drawing inspiration from biology and neurophysiology, recent progress for many natural language processing (NLP) tasks has been remarkable. Deep neural network-based approaches have made progress in areas such as: machine translation, sentence summarization, dialogue agents, speech recognition, and conversational bots. Such approaches often employ a neural language model (NLM) as a decoder at inference time to generate a sequence of tokens, e.g., words, given an input, typically via beam search.

One long-recognized issue of decoding using NLMs is the computational complexity, which easily becomes a bottleneck when the vocabulary size is large. Consider a beam search decoder using a NLM. At each decoding step, a recurrent neural network first generates a context vector based on each partial hypothesis in the beam. The beam search decoder may then use a softmax layer to compute a normalized word probability distribution over the vocabulary. The softmax layer may include an inner product operator that projects the context vector into a vocabulary-sized vector of scores, followed by a softmax function that transforms a vocabulary-sized logits into a vector of probabilities. Finally, the beam search decoder selects the top-K words with the highest probabilities given the context, e.g., the top-K maximum subset of inner product, and stores the expended hypotheses and their probabilities in the beam. The most computationally expensive part in this process is the softmax layer, where the complexity is linear with respect to the vocabulary size.

Many techniques have been proposed to speed up the softmax layer in training, such as hierarchical softmax and sampling-based approaches. These approaches, however, cannot be directly applied to decoding because the approaches rely on knowing the words to be predicted and need to calculate the probability of all words to find the most likely prediction during decoding. Other works speed up softmax inference in training and decoding by reducing the cost of computing each word's probability using some approximation. However, the complexity of softmax is still linear with respect to the size of the vocabulary.

DETAILED DESCRIPTION

Figure 1A:
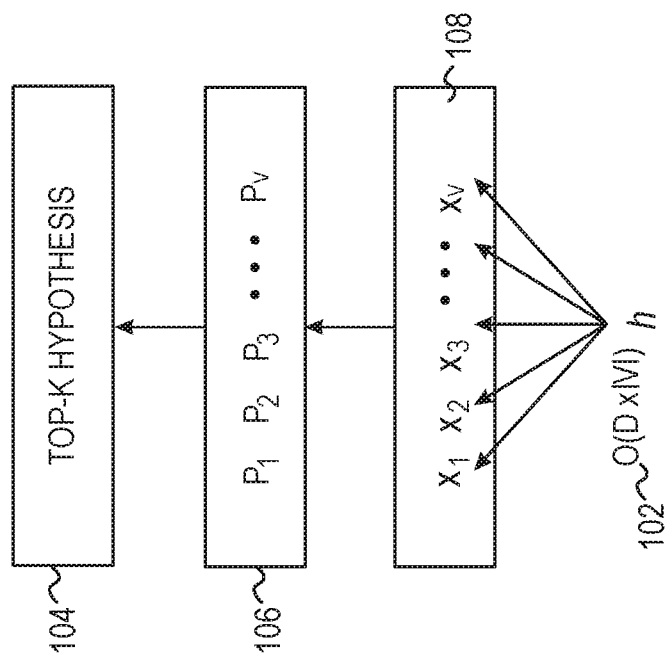
FIG. 1A illustrates one decoding step using an NLM with a vocabulary V in accordance with respective examples.

Despite the large number of words in a vocabulary, a human brain is capable of managing the vocabulary effectively and navigates the massive mental lexicon very efficiently. How the vocabulary is stored and represented in the human brain is not well understood. One of the theories from biological science indicates that the human language has a character of a complex network, where the intrinsic relational structure, which refers to the fact that words are related to each other and thus form a small world graph, provides some hints on how the lexicon is mentally organized. A small world graph is a type of graph in which most nodes are not neighbors to one another. The neighbors of a node are likely to be neighbors of one another. In addition, most nodes may be reached from any other node by a small number of steps. In various embodiments, the number nodes of small world graph is a configurable option.

To predict the next word given a context, humans never examine every word in the vocabulary stored in their brains. Instead, a person may immediately identify a small set of K candidate words that are most semantically related to the context, and then pick the most proper word among the candidates. In an example, a vocabulary of a NLM may be represented using a similar data structure of a small world graph. Using the small world graph may significantly improve the decoding efficiency of NLMs because at each decoding step the softmax layer only needs to explicitly compute the probabilities of the K words, where K is much smaller than the vocabulary size. Accordingly, various examples help manage large corpus of vocabulary words by focusing on a small world graph representation of the phrases to manage the conversation. In this manner, the described techniques achieve a variety of technical advantages including, but not limited to, decreasing decoding time, increasing computing system speed, conserving memory, and reducing processor load.

In an example, a Fast Graph Decoder (FGD) is described. The FGD may be used to approximate the softmax layer of a NLM in the beam search decoding process. The FGD may be constructed by building a small world graph representation of a NLM vocabulary. The nodes in the graph may be words, with each word being represented using a continuous vector which is transformed from its word embedding vector in the NLM. The edges in the graph encode the word-word distances in a well-defined metric space. Then, at each decoding step, for a given context, e.g., a partial hypothesis in the beam, the top-K hypotheses are identified. The probabilities of the top-K hypotheses in the softmax layer of the NLM are computed. In various examples, finding the top-K hypotheses in the softmax layer is equivalent to finding the K nearest neighbors using FGD in the small world graph. Using FGD, however, may be performed approximately using an efficient graph navigating method. The decoding error due to use of the approximated K nearest neighbor search with graph navigation may be theoretically bounded.

In an example, the effectiveness of described embodiments is shown on two NLP tasks: neural machine translation and language modeling. Empirical results show that FGD achieves an order of magnitude speedup while attaining the accuracy, in comparison with existing state-of-the-art approaches.

The softmax layer of a NLM may be the computational bottleneck at decoding time in many NLP tasks. Consider a NLM that uses a two-layer long short-term memory (LSTM) and a vocabulary size of V. The total number of floating point operations (FLOPS) per LSTM step is 2(layer)×(I+D)×D×4×2, where I and D represent the input and hidden dimensions, respectively. The 4×2 is based on the LSTM having three gates and one memory cell and each weight values causes a multiple-and-add operation. The number of FLOPS of the softmax layer is D×|V|×2, which is proportional to |V|. Assuming that the dimension of the input and hidden layers of the LSTM is 500 and the vocabulary size is 50K, the LSTM part has 8M FLOPS whereas the softmax layer has 50M FLOPS. The softmax layer dominates the computational cost of the NLM, and even more as the vocabulary size grows.

This decoding bottleneck limits NLMs' application in many interactive services such as web search, online recommendation systems and conversational bots, where low latency, often at the scale of milliseconds, is required. In addition, unlike model training where the massive parallelism power of graphics processing units (GPUs) may be leveraged, decoding may run on various clients ranging from a PC, a mobile, to IoT (Internet of Things), etc. Devices that run the decoding may have limited hardware resources and not have GPUs available. Therefore, faster decoding would broaden the applicability of NLMs.

Various examples describe a Fast Graph Decoder (FGD) that is used to approximate the softmax layer in NLMs. FGD may work in two steps, as illustrated in FIG. 1. First, for any given NLM, a small world graph to represent its vocabulary is constructed. Second, at each step in the beam search decoding, the top-K words that are most likely to occur are found for each partial hypothesis in the beam, e.g., context. The expended hypotheses and their probabilities are stored in the beam. FGD is more efficient than the full softmax in that when expanding a partial hypothesis only the probabilities of the top-K words need to explicitly compute instead of every word in a vocabulary. In addition, there is an efficient search method of identifying the top-K words on the small world graph without searching over the entire vocabulary.

Figure 1B:
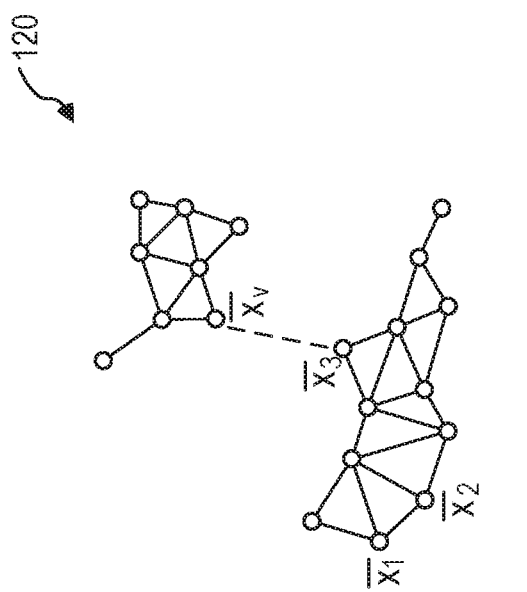
FIG. 1B illustrates the transformation from the word embedding vectors of the NLM vocabulary in accordance with respective examples.
Figure 1C:
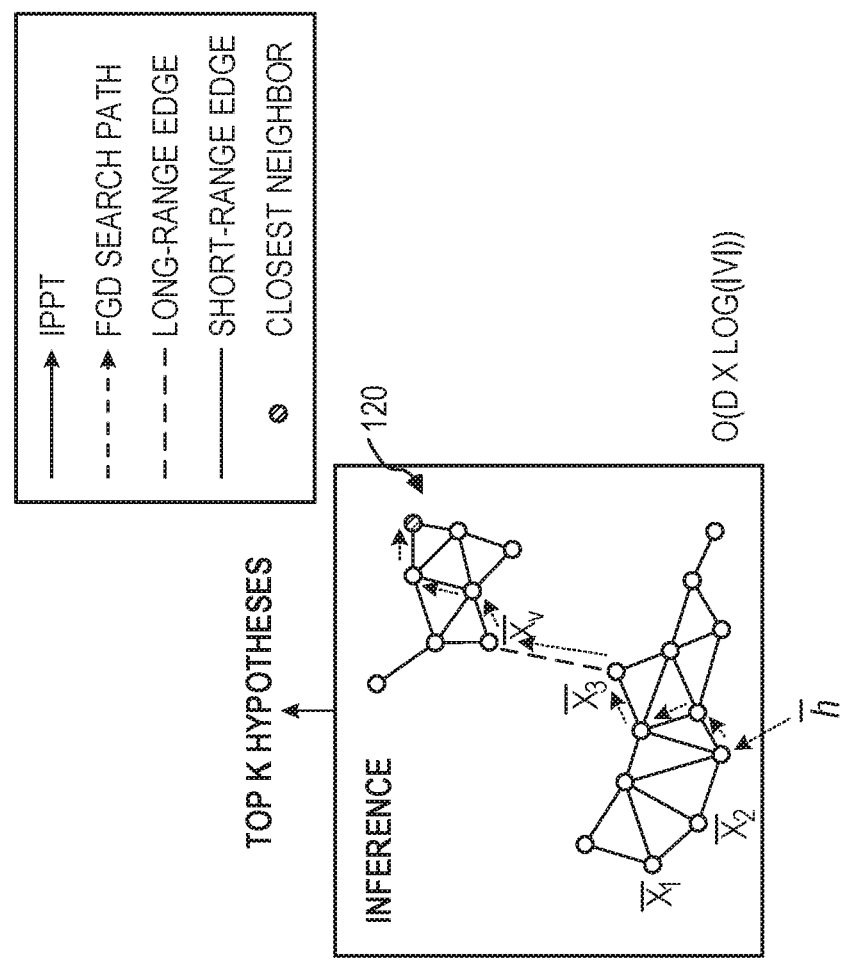
FIG. 1C illustrates one step of decoding using FGD in accordance with respective examples.

FIG. 1A illustrates one decoding step using an NLM with a vocabulary V 108 in accordance with respective examples. In FIG. 1A, the top-K hypothesis 104 from all possible hypotheses 106 generated by V using a softmax layer are selected from a context vector $h \in \mathcal{R}^D$. The complexity of the softmax layer is O(D×|V|) 102. FIG. 1B illustrates the transformation from the word embedding vectors of the NLM vocabulary 108 in accordance with respective examples. The NLM vocabulary 108, $x_1, x_2, \ldots x_{|V|}$ is transformed to a small world graph 120 representation that encodes word-word distances in a well-defined metric space. This transformation may occur once offline and is used for FGD to perform fast decoding. FIG. 1C illustrates one step of decoding using FGD in accordance with respective examples. For a given context vector h, FGD identifies a top-K hypotheses by traversing the small world graph 120 and produces the probabilities for each hypothesis. The complexity of the FGD-approximated softmax layer is O(D× log |V|).

In an example, finding the top-K words for a given context may be implemented by finding the K nearest neighbors in a vector space. The small world graph has been recently introduced to address the problem of nearest neighbor search. Research shows that navigation in small world graph exhibits O(log N) search complexity where N represents the number of nodes in the graph, and performs well in high dimensionality. To achieve logarithmic nearest neighbor search complexity, the small world graph holds the small world properties which are detailed below, such as: great local connectivity, as in a lattice graph; combined with a small graph diameter, as in a random graph; and a well-defined pair-wise metric distance among words.

In an example, the small world graph may be constructed by denoting $G=(\overline{X}, E)$ as a small graph with the set of $\overline{X}$ as graph nodes and E as graph edges. Given a NLM vocabulary, which may be a set of words embedding vectors $X=[x_1, x_2, \ldots x_{|V|}]$, $x_i \in \mathcal{R}^D$, the construction of its small world graph G may be completed in two steps. First, the node set $\overline{X}$ may be constructed. An example node set is shown in FIG. 1B. In an example, to construct the node set $\overline{X}$, each word embedding vector $x_i$ in X, a transformation is applied to obtain $\overline{X}=[\overline{x_1}, \overline{x_2}, \ldots \overline{x_{|V|}}]$, $\overline{x_i} \in \mathcal{R}^{D+2}$ that establishes the equivalence of finding the top-K maximum subset of inner product in $\overline{X}$ and search for the top-K nearest neighbors in with a given distance metric ρ. In an example, the transformation used is an inner product preserving transformation (IPPT). Next, an edge set E may be constructed from $\overline{X}$. A small world graph may be formed given $\overline{X}$ by imposing the set E based on the distance metric ρ.

Using inner product over word embedding vectors to measure word-word distance is deficient because this approach lacks very basic properties that need to hold for distance, i.e., the inverse of similarity, functions in metric spaces, e.g., Euclidean spaces,—identity of indiscernibles and triangle inequality. For example, under the Euclidean space, two points are the same if their distance is 0. The inner product of a point x to itself is $\|x\|^2$, but there may be other points whose inner product to x is smaller than $\|x\|^2$. The search process on small world graphs relies on these properties to converge and achieve the efficiency benefits.

In one example to create a small world graph with a well-defined metric distance between words, a new method called Inner Product Preserving Transformation (IPPT) may be used to convert word embedding vectors to higher dimensional vectors. Equivalence of finding top-K maximum subset of inner product and searching for top-K nearest neighbor is established with a distance metric in the higher dimension space. The notation $\langle \bullet, \bullet \rangle$ for the inner product and $\rho(\bullet, \bullet)$ for the distance in Euclidean space.

In an example, it is possible to define particular transformation functions for word embedding vectors and the given context vector, respectively, so that the transformation is inner product preserving. Formally, let $x_i \in \mathcal{R}^D$ and $b_i \in \mathcal{R}$ be the word embedding vector and bias at position i in the softmax layer, respectively, for $1 \leq i \leq |V|$. Choose a constant U such that $$U \geq \max_{i \in V} \sqrt{\|x_i\|_2^2 + b_i^2}.$$

In an example, U is set to the max value and is later denoted as $U_{max}$. In this discussion, let [;] represent vector concatenation. The transformation function for word embedding vectors $$\phi: \{(\xi, \eta) \in \mathcal{R}^D \times \mathcal{R} : \|\xi\|_2^2 + \eta^2 \leq U^2\} \to \mathcal{R}^{D+2}$$

may be defined as $$\phi(x, b) = \left[x; b; \sqrt{U^2 - \|x\|_2^2 + b^2}\right].$$

The transformation of a given context vector $h \in \mathcal{R}^D$ may be given as $\bar{h} = [h; 1; 0] \in \mathcal{R}^{D+2}$. These transformations are inner product preserving in that for any $i \in V$ there is $$\langle x, h_i \rangle + b_i = \langle \bar{h}, \phi(x_i, b_i) \rangle = \frac{1}{2}\left(U^2 + 1 + \|h\|_2^2 - \rho(\bar{h}, \phi, (x_i, b_i))^2\right).$$

The above description indicates that the transformation is both "order preserved" and "value preserved". The former means that given a context vector, its top-K closest words identified using the inner product in the word embedding space are the same as the top-K closest words identified according to the Euclidean distance in the transformed space. The latter means that the ratio of the two distance scores between the context and a word computed in the two spaces respectively is a constant. Accordingly, given a context, the same top-K hypotheses may be found in either space. In the context of decoding using a NLM, the above description implies that given a context, finding the context's top-K words using the softmax layer in the NLM is equivalent to finding the context's K nearest neighbors in the small world graph constructed from the NLM vocabulary.

Formally, the top-K maximum (minimum) subset may be formally defined as: Let V be the set of vocabulary, and $1 \leq K \leq |V|$. $\mathcal{K}$ may be called a top-K maximum (minimum) subset for a function $f: V \to \mathcal{R}$, if $|\mathcal{K}| = K$ and $f(v_i) \geq f(v_j)$ ($f(v_i) \leq f(v_j)$) for all $v_i \in \mathcal{K}$ and $v_j \notin \mathcal{K}$. If $1 \leq K \leq |V|$ and consider a fixed context vector h, and let $K \subseteq V$ be a top-K maximum subset for $v_i \mapsto \langle h, x_i \rangle + b_i$, then $\mathcal{K}$ is also a top-K minimum subset for the Euclidean distance $v_i \mapsto \rho(\bar{h}, \phi(x_i, b_i))$.

In an example and based on the above, a small world graph is constructed using a Fast Graph Decoder Preprocessing (FGD-P). Given a trained NLM with its vocabulary represented as word embedding vectors X, FGD-P first constructs the node set X using IPPT as described above and shown in lines 4-9 in TABLE 1. $U_{max}$ depends on the word embedding vectors and influences how transformations are done. In an example, $U_{max}$ is based on the maximum column norms of the word embedding vectors. $U_{max}$ may be set equal to or greater than the maximum column norm of the word embedding vectors. In an example, the FGD-P algorithm is run offline and not in real time.

TABLE 1

1: Input: Trained weights of the softmax layer X, and bias vector b.
2: Output: Small world graph G, and $U_{max}$.
3: Hyperparameter: Small world graph neighbor degree M.
4: for all i in (0.. |X| − 1) do TABLE 1-continued 5: $\tilde{X}_{:,i} \leftarrow [X_{:,i}; b_i]$   //Word embedding and bias fusion
6: $U_{max} \leftarrow \max_i \|\tilde{X}_{:,i}\|_2$
7: for all i in 0..(|W| − 1) do
8: $\Delta_i \leftarrow \sqrt{U_{max}^2 - \|\tilde{X}_{:,i}\|_2^2}$   // Calculate the normalizer
9: $\bar{X}_{:,i} \leftarrow [\tilde{X}_{:,i}; \Delta_i]$
10: G ← CreateSwg($\bar{X}$, M)   // Build small world graph Then, FGD-P may form the final graph using G=CreateSwg(X, M) by inserting edges among nodes (line 10). G is constructed in the way that all the small world properties are held. In an example, a Hierarchical Navigable Small Worlds (HNSW) algorithm is used to build the small world graph.

The small world graph may be built incrementally by iteratively inserting each word vector $\bar{x}_l$ in $\bar{X}$ as a node in G. Each node generates M, i.e., the neighbor degree, out-going edges. Among those, M−1 are short-range edges, which connect $\bar{x}_l$ to M−1 nearest neighbors according to their pair-wise Euclidean distance to $\bar{x}_l$ e.g., the edge between $\bar{x}_1$ and $\bar{x}_2$ in FIG. 1B. The last edge is a long-range edge that connects $\bar{x}_l$ to a randomly selected node, which does not necessarily connect two closest nodes but may connect other isolated clusters, e.g., the edge between $\bar{x}_3$ and $\bar{x}_{|V|}$ in FIG. 1B. In this way, constructing G by inserting these two types of edges guarantees the graph small world properties of the resulting G is theoretically justified.

The constructed small world graph using all $\bar{x}_l$ becomes the ground layer $L_0$ of G. CreateSwg then creates a hierarchical small world graph by selecting a chain of subsets $V=L_0 \supseteq L_1 \supseteq \ldots \supseteq L_l$ of nodes as "layers". Each node in $L_k$ is randomly selected to $L_{k+1}$ with a fixed probability of 1/M. On each layer, the edges are defined so that the overall structure becomes a small world graph, and the number of layers is bounded by O(log |V|/log M).

FGD may be used for fast decoding, e.g., as shown in FIG. 1C, using a Fast Graph Decoder Inference (FGD-I) algorithm. An example of the FGD-I algorithm is shown below in TABLE 2. At line 4 of this example algorithm, a context vector h is transformed to [h; 1; 0] ∈ $\mathcal{R}^{D+2}$. Then SearchSwg (G,h,K) is called to search in the small world graph to identify the top-K hypothesis. In an example, the search is performed using Hierarchical Navigable Small Worlds (HNSW).

The search of the graph may start from the graph's top layer and use a greedy search to find the node with the closest distance to $\bar{h}$ as an entry point to descend to the lower layers. The upper layers route $\bar{h}$ to an entry point in the ground layer that is already close to the nearest neighbors to $\bar{h}$. Once reaching the ground layer, SearchSwvg may employ a prioritized breath-first search. This search examines neighbors and stores all the visited nodes in a priority queue based on their distances to the context vector. The length of the queue is bounded by ef Search, a hyperparameter that controls the trade-off between search time and accuracy. When the search reaches a termination condition, e.g., the number of distance calculation, SearchSwg returns the results of top-K hypotheses and their distances to $\bar{h}$. The distance value may then be transformed back to the original inner product space, lines 5-7. FGD-I generates the output by computing a softmax distribution over the inner product of the top-K returned results (line 8). In practice, setting K=|V| is both slow and unnecessary. An approximated approach with K<<|V| is often much more efficient without sacrificing accuracy. In addition, the error in approximating a softmax layer via computing a probability distribution using only the top-K distances scores is theatrically bounded, such that approximating the softmax layer is a feasible solution.

TABLE 2

1: Input: Context vector h, small world graph G, and $U_{max}$.
2: Output: Probability distribution P over top-K word hypotheses.
3: Hyperparameter: Candidate queue length ef Search.
4: $\bar{h} \leftarrow [h; 1; 0]$ // Map context vector from $\mathcal{R}^D$ to $\mathcal{R}^{D+2}$
5: $I^K, D^K \leftarrow$ SearchSwg(G, $\bar{h}$, K) // Return top-K hypotheses with
// minimal distance to h
6: for all i in 0..(K − 1) do 7: $S[I_{:,i}^K] \leftarrow \frac{1}{2}\left(\|\bar{h}\|_2^2 + U_{max}^2 - D_{:,i}^{K^2}\right)$ 8: P ← exp(S)/ exp(S) // Compute top-K softmax
probability distribution In an experiment, FGD was run on two different asks, neural machine translation (NMT) and language modeling (LM). NMT is a sequence-to-sequence model which contains a recurrent neural network (RNN) encoder and an RNN decoder. The decoder contains an output projection at every step to predict the next word. Decoding time and bilingual evaluation understudy (BLEU) scores are the two major metrics used for evaluation. Better results are indicated by a lower decoding time without sacrificing much BLEU score. In an experiment, a global attention-based encoder-decoder model with a two-unidirectional-stacked LSTM using the OpenNMT-py toolkit was trained on the IWSLT'14 German-English corpus. The LSTM hidden dimension size was set to 200. The model was optimized with stochastic gradient descent (SGD) using an initial learning rate of 1.0 and a dropout ratio of 0.3. The dataset was tokenized and preprocessed using the OpenNMT data preprocessor with |V|=50, 000 frequent words. BLEU scores were computed with the Moses toolkit.

Once the model was trained, the trained weights in the softmax layer were processed using FGD-P offline. It took three minutes on a server to construct the small world graph. During online processing, the hyperparameter, ef Search, decides the length of the candidate queue to track nearest neighbors, which offers the trade-off between the online decoding speed and the BLEU score quality. Different ef Search values were tested and in this experiment [20, 200] was a good range.

Two approaches were used for comparison: 1) a full-softmax approach; and 2) a state-of-the-art approach, called SVD-softmax. SVD-softmax improves the inference speed by approximating softmax layer using singular vector decomposition (SVD). The SVD-softmax implementation tested included two steps: the probability of each word is estimated using a small part of the softmax weight matrix, and then a refinement on top-V most likely words is performed based on the previous estimated results. SVD-softmax reduces the complexity from O(|V|×D) to O(|V|× D̄+|V|×D), where 1≤D̄<D. Two configurations of SVD-softmax were tested: SVD-a and SVD-b.

Figure 2:
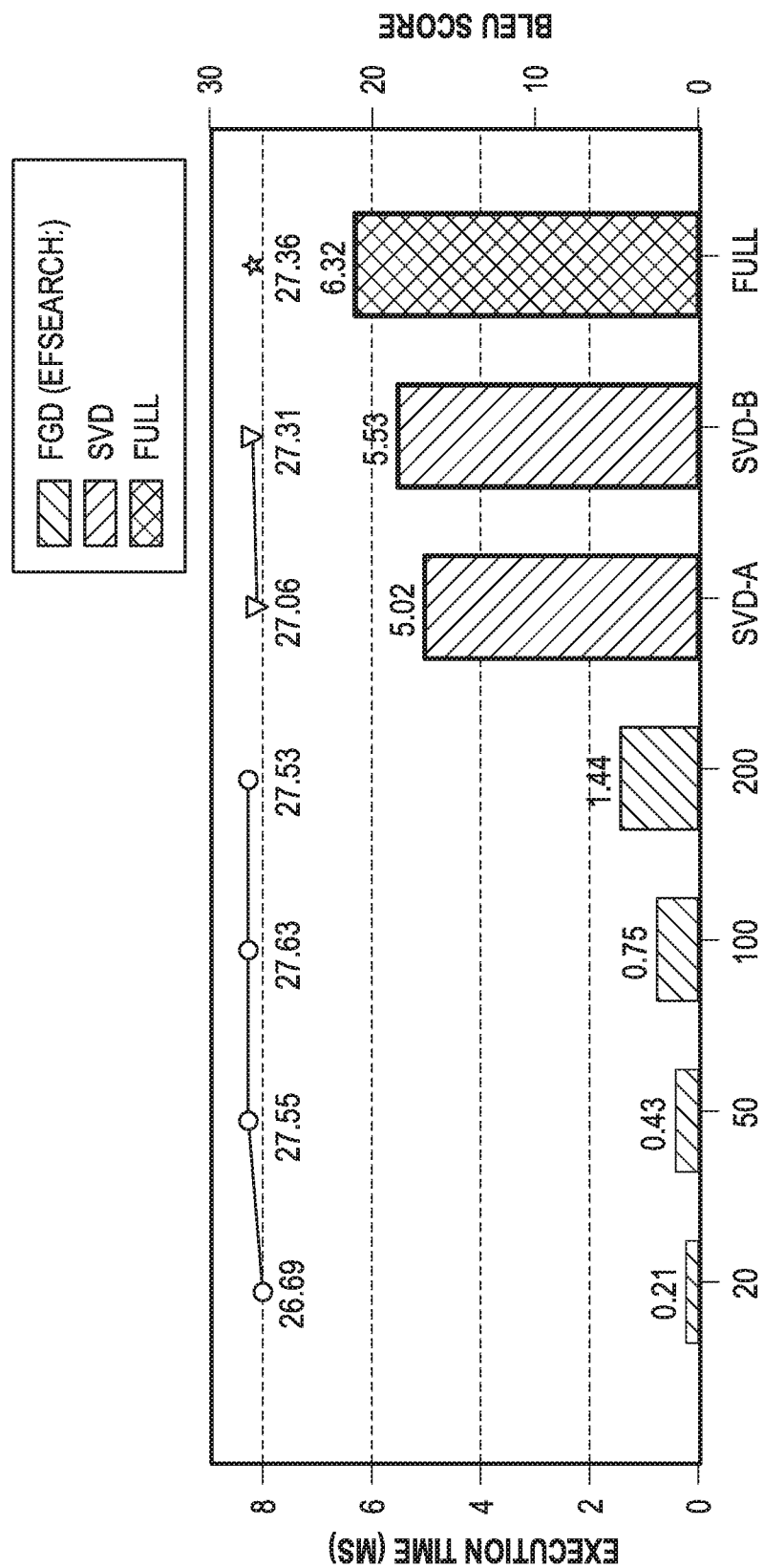
FIG. 2 is a graph that shows the softmax layer and BLEU scores of an NMT model in accordance with respective examples.

FIG. 2 shows the softmax layer and BLEU scores of an NMT model. Different values of the hyperparameter ef Search are shown along the x-axis for the FGD results. Different values tested were [20, 50, 100, 200]. The BLEU scores are shown at the top of the graph. FGD achieved significantly lower execution time than the existing methods along with comparable BLEU scores.

Comparing with full softmax, when ef Search is 20, FGD reduces the execution time from 6.3 ms to 0.21 ms, achieving a 30× speedup at the cost of losing only 0.67 BLEU score. By increasing ef Search to 50, FGD obtains nearly the same BLEU score as the full-softmax baseline, while reducing the execution time from 6.3 ms to 0.43 ms, a 14× speedup.

For SVD-softmax, SVD-b approached a BLEU score close to the full-softmax baseline, but is much slower than FGD in terms of the execution time (5.53 ms vs 0.43 ms). SVD-a shows slightly better performance than SVD-b but with a lower BLEU score. Although the theoretical speedup of SVD-a is 5.5×, it gets only 1.3× speedup in practice because the top-V most likely words selected in the first step appear at discontinuous locations in memory, which causes non-negligible memory copy costs to bring them to a continuous space for the second step calculation.

Figure 3:
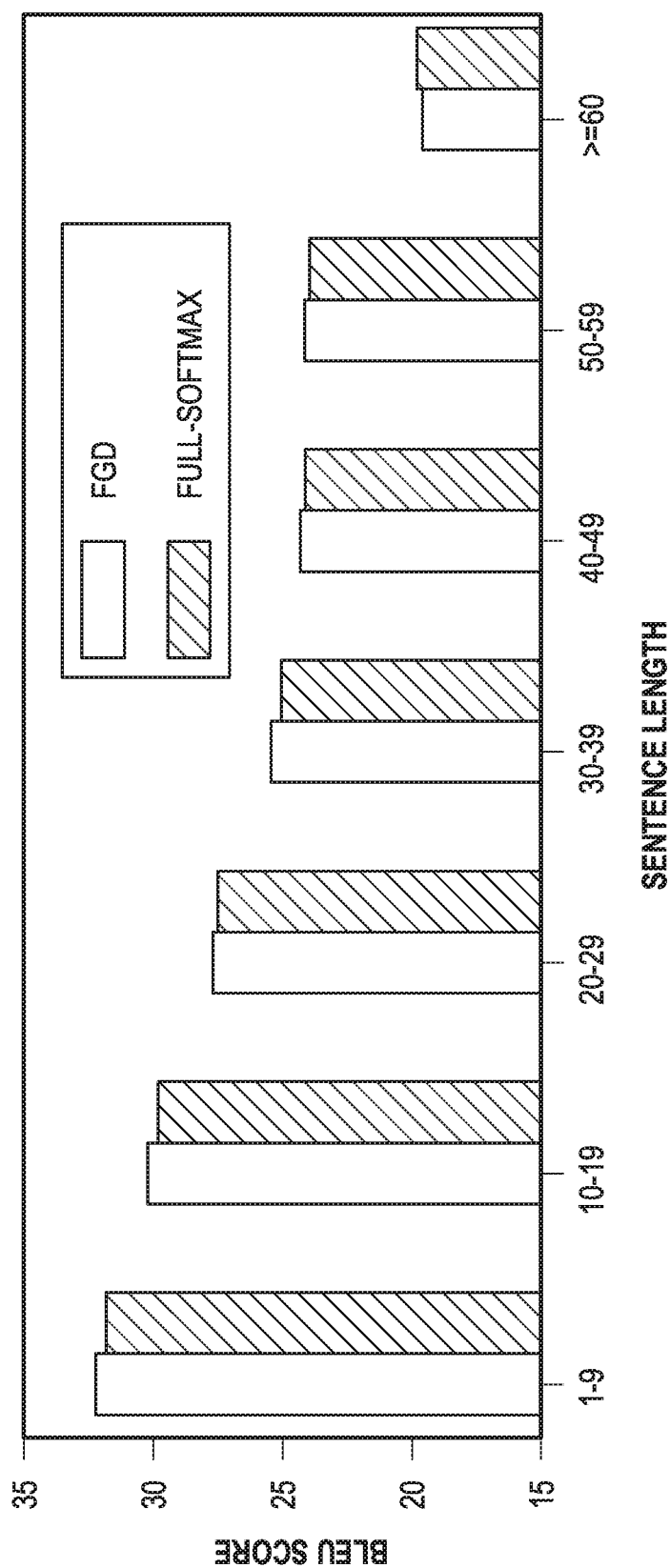
FIG. 3 is a graph that illustrates BLEU scores by sentence length in accordance with respective examples.

FIG. 3 illustrates BLEU scores by sentence length. Results shown in FIG. 3 were generated using ef Search=100. As seen in FIG. 3, FGD is on a par with the full softmax baseline uniformly on different lengths, without a statistically significant difference. This demonstrates the robustness of FGD across sentences with different sizes.

In addition, the beam sizes were varied among [1, 2, 5, 10], which are typical settings used in prior work. TABLE 3 shows that when ef Search is equal or larger than 50, FGD obtains BLEU scores close to the full softmax baseline under all beam sizes without statistical significance.

TABLE 3

| ef Search | Beam = 1 | Beam = 2 | Beam = 5 | Beam = 10 |
| --- | --- | --- | --- | --- |
| 20 | 26.69 | 27.65 | 27.81 | 27.62 |
| 50 | 27.545 | 28.76 | 29.06 | 28.90 |
| 100 | 27.63 | 28.94 | 29.28 | 29.10 |
| 200 | 27.53 | 28.99 | 29.28 | 29.22 |
| Full | 27.36 | 28.91 | 29.45 | 29.34 |

Two metrics, precision@K (or equivalently P@K) and dist_cnt may be analyzed to under FGD's decoding time improvement. Precision@K measures the proportion of overlap between retrieved top-K hypotheses and expected top-K hypotheses, based on what top-K on a full-softmax would return. dist_cnt measures the number of distance computations in FGD under a given ef Search. TABLE 4 reports precision@K when K is 1, 2, 5, and 10, which correspond to beam sizes 1, 2, 5, and 10 respectively, and dist_cnt with vs. without FGD. Overall, FGD achieves fairly high precision. In particular, gradually increasing ef Search leads to higher precision at the expense of increased number of distance computation. This matches the observation that higher ef Search leads to higher BLEU scores, TABLE 1, but also longer execution time, FIG. 2. Further increasing ef Search leads to little extra precision improvement but significantly more distance computation because the precision is getting close to 1, which explains why FGD is able to achieve close to baseline BLEU scores, TABLE 1. In addition, under the same ef Search, further increasing K may lead to slightly worse precision if ef Search is not big enough (e.g., ef Search is 20), as the highest ranked words not visited during the graph search are definitely lost. On the other hand, the computation of distance grows proportional to the increase of ef Search. Comparing with the full-softmax, the amount of distance computation is reduced by 10-50 times, which explains the speedup of decoding time shown in FIG. 2.

TABLE 4

| ef Search | P@1 | P@2 | P@5 | P@10 | Dist_cnt (FGD/Full) |
|---|---|---|---|---|---|
| 20 | 0.939 | 0.934 | 0.929 | 0.918 | 981/50K |
| 50 | 0.974 | 0.974 | 0.973 | 0.971 | 1922/50K |
| 100 | 0.986 | 0.986 | 0.987 | 0.987 | 3310/50K |
| 200 | 0.992 | 0.993 | 0.994 | 0.994 | 5785/50K |

A second experiment was run on language modeling. In this second experiment, the impact of vocabulary size and word embedding dimension on FGD was evaluated using language modeling on WikiText-2, a large language modeling dataset. The model used a two-layer LSTM. This experiment explored multiple models with different vocabulary sizes of 10,000 (10K); 20,000 (20K); 40,000 (40K); and 80,000 (80K). The vocabulary was created by tokenizing raw texts via the Moses toolkit and choosing the correspondingly topmost frequent words on the raw WikiText-2 dataset. Both the input and the hidden dimensions were set to 256.

TABLE 5 shows the impact of search quality by varying the vocabulary size from 10K to 80K. With the same ef Search, FGD generally obtains better precision results for smaller vocabularies; while with the same vocabulary size, bigger ef Search values were better for high precision. With ef Search being 200, FGD gets very close to 1.

TABLE 5

| | | FGD (efSearch) | | | |
|---|---|---|---|---|---|
| |V| | P@K | 20 | 50 | 100 | 200 |
| 10K | P@1 | 0.870 | 0.938 | 0.989 | 1.00 |
| | P@10 | 0.909 | 0.972 | 0.992 | 0.998 |
| 20K | P@1 | 0.845 | 0.932 | 0.975 | 0.995 |
| | P@10 | 0.871 | 0.955 | 0.987 | 0.997 |
| 40K | P@1 | 0.808 | 0.912 | 0.936 | 0.980 |
| | P@10 | 0.845 | 0.931 | 0.961 | 0.991 |
| 80K | P@1 | 0.832 | 0.933 | 0.966 | 0.982 |
| | P@10 | 0.858 | 0.945 | 0.978 | 0.994 |

Figure 4:
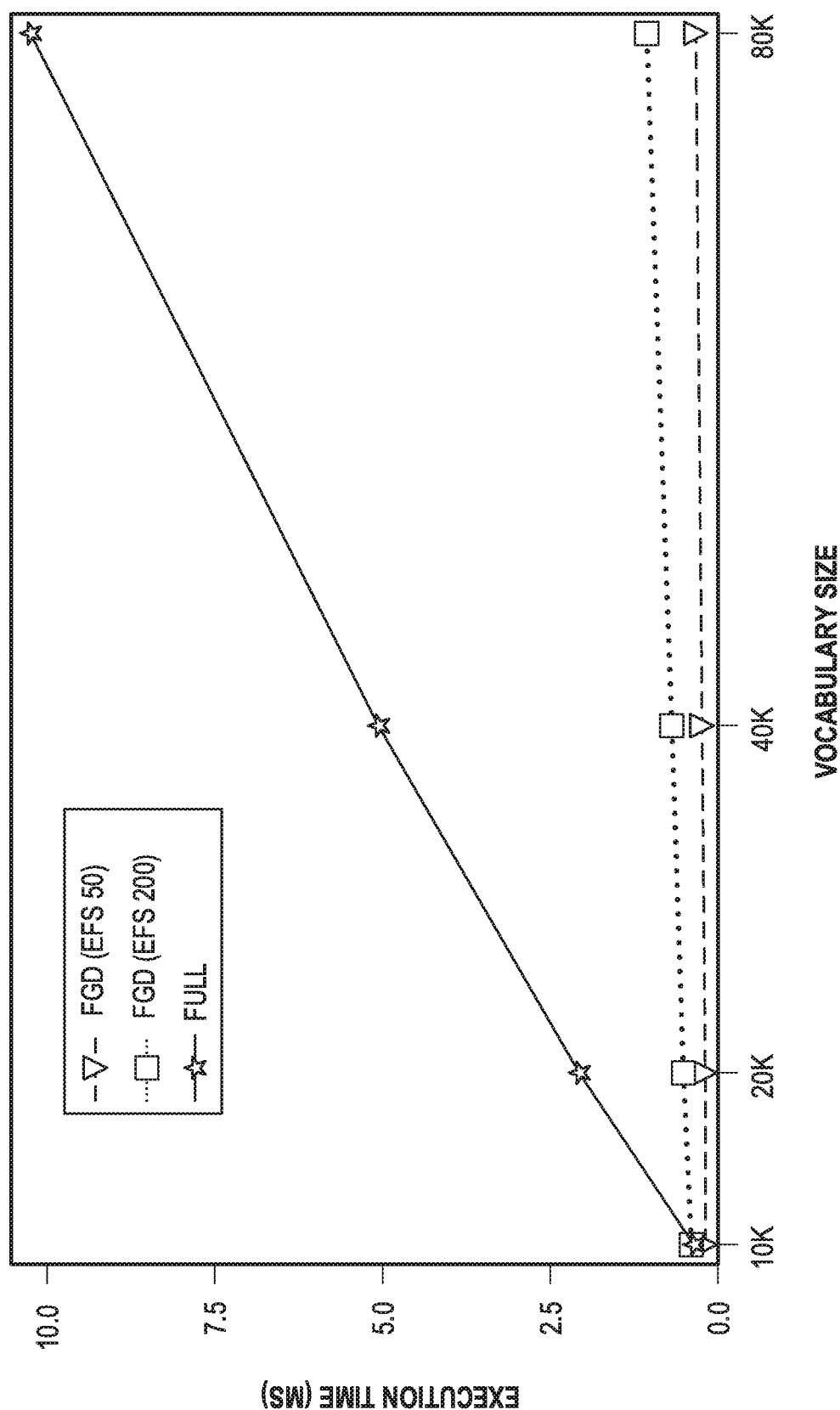
FIG. 4 is a graph that shows decoding time of varying vocabulary sizes in accordance with respective examples.

FIG. 4 shows the decoding time of varying vocabulary sizes on the full softmax baseline and FGD, setting ef Search={50, 200} for the sake of readability. As expected, the execution times all increase with increases in vocabulary size. However, compared to the baseline, FGD provided a shorter execution time consistently. As the vocabulary size increased, the execution time of the baseline increased almost linearly, whereas FGD's execution time increased much more slowly. This was because the complexity of softmax is O(D×|V|), which is linear to the size of the vocabulary, whereas the complexity of FGD is O(D×log |V|), which is logarithmic to |V|. Therefore, FGD scaled much better and the improvement became more significant with larger vocabulary sizes. In particular, FGD was more than an order of magnitude faster than the baseline when the vocabulary size was medium or large. For example, FGD achieved more than a 30× speedup with |V|=80K when ef Search=50. Various word embedding dimensions were also tested. FGD consistently achieved a high precision with an order of magnitude execution time reduction compared to the softmax baseline.

Accordingly, FGD provides a novel softmax layer approximation that quickly navigates on a small world graph representation of word embeddings to search for a set of K words that are most likely to be the next words according to NLMs. On neural machine translation and neural language modeling, FGD reduces the decoding time by an order of magnitude compared with the full softmax baseline while attaining similar accuracy on neural machine translation and language modeling tasks.

Figure 5:
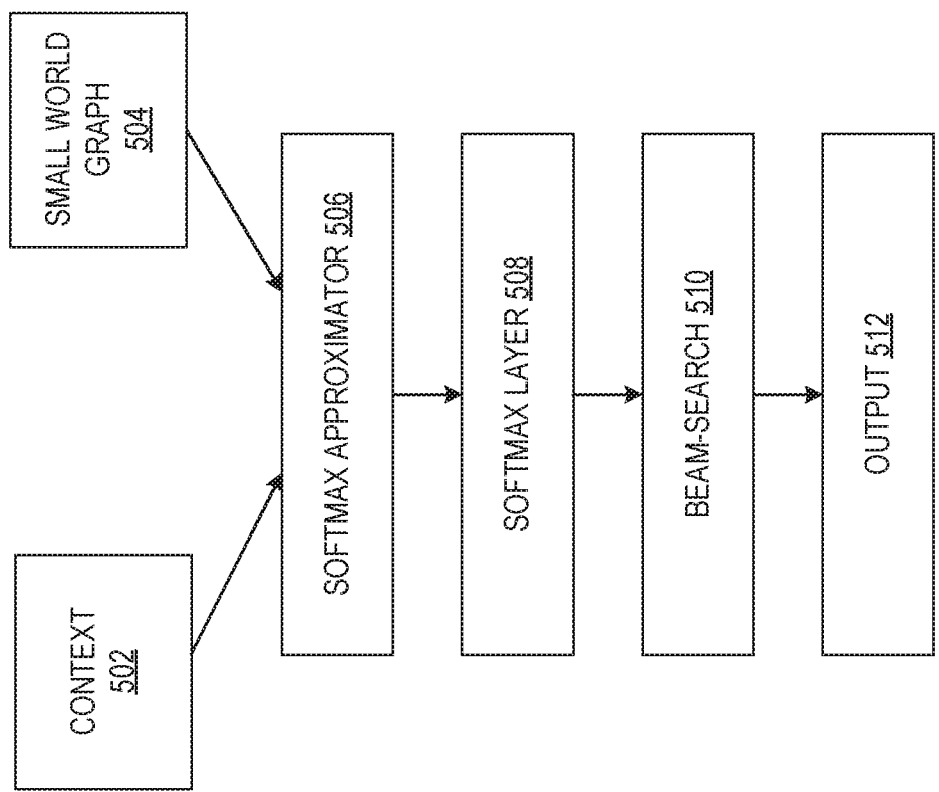
FIG. 5 is a system diagram for approximating a softmax layer in accordance with respective examples.

FIG. 5 is a system diagram for approximating a softmax layer in accordance with respective examples. A context 502 provides a context for a next word. The next word may be the next word within a sentence. The content may include n-previous words of the sentence leading up to the next word. For example, the sentence "The quick brown fox jumps over the lazy dog" may be a sentence that is being decoded. Decoding may be part of a machine translation process, speech recognition, conversational bot, etc. The decoding may have decoded the first four words, such that the context may include the words "The quick brown fox." A softmax layer 508 may be used to select the next word from a vocabulary. The softmax layer 508, however, includes weights that may be associated words to predict the next word. A softmax approximator 506 provides those weights. A small world graph 504 may be constructed from the vocabulary as defined above in TABLE 1. The small world graph 504 and the context 502 may be provided to the softmax approximator. Weights for the softmax layer 508 may be generated as described in TABLE 2. The softmax layer 508 may then be used as input to a beam-search 510 to generate an output 512. In this example, the output 512 is the fifth word in the sentence. A correct output, therefore, would return "jumps."

Figure 6:
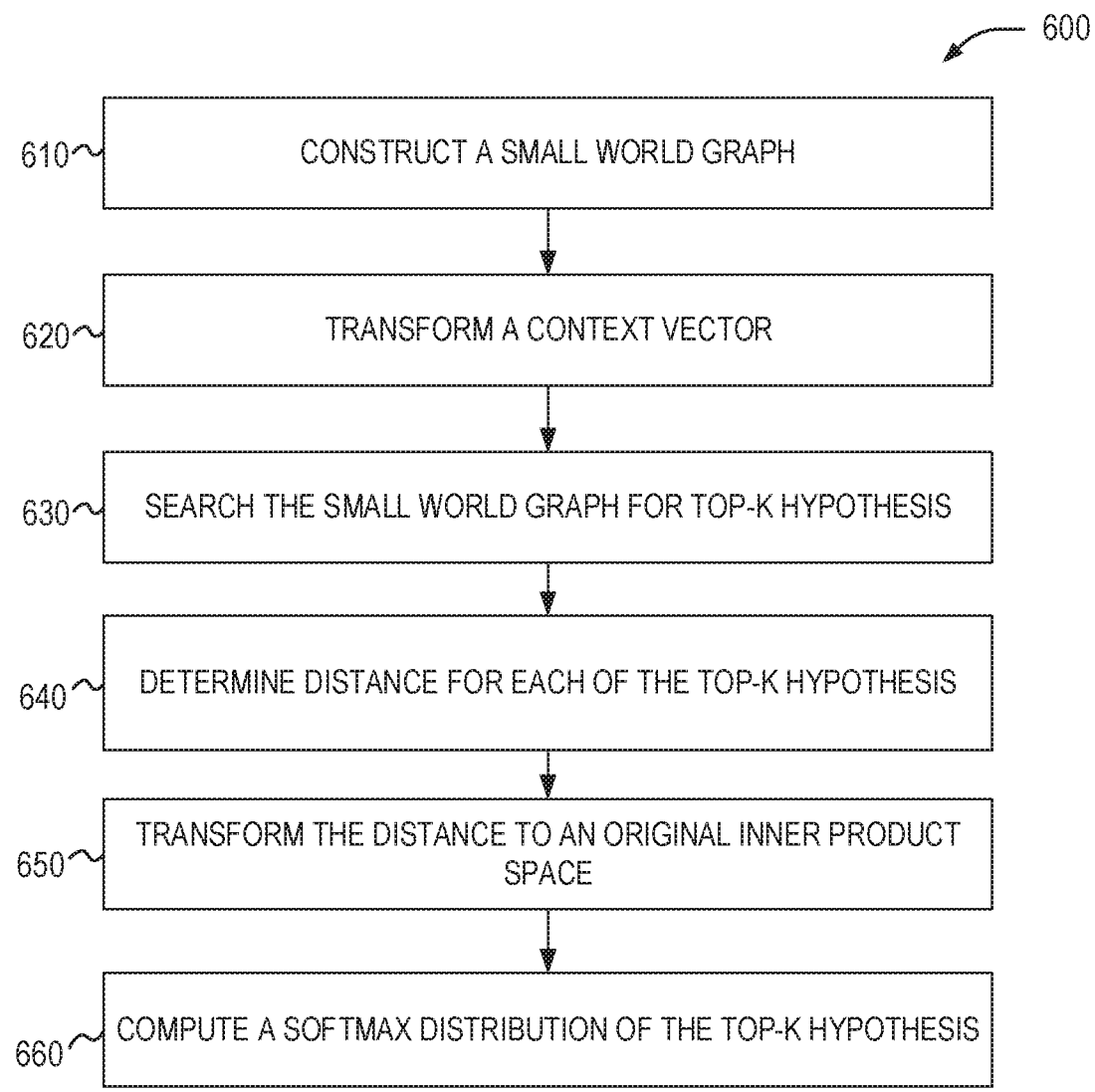
FIG. 6 is a flow diagram of a process for approximating a softmax layer in accordance with respective examples.

FIG. 6 is a flow diagram of a process 600 for approximating a softmax layer in accordance with respective examples. At 610, a small world graph is constructed. In an example, the small world graph is constructed as described above in TABLE 1. At 620, a context vector is transformed. In an example, this transformation corresponds with line 4 from TABLE 2. At 630, the small world graph is searched for the top-K hypothesis, line 5 in TABLE 2. At 640, a distance for each of the top-K hypothesis to the transformed context vector is determined. At 650, the distance is transformed back to the inner product space, line 7 of TABLE 2. At 660, the softmax probability distribution is computed, line 8 in TABLE 2. The softmax probability distribution may then be used to construct the softmax layer that is part of a decoder. As described above, the decoder may be part of a machine translation process, speech recognition, conversational bot, etc.

Figure 7:
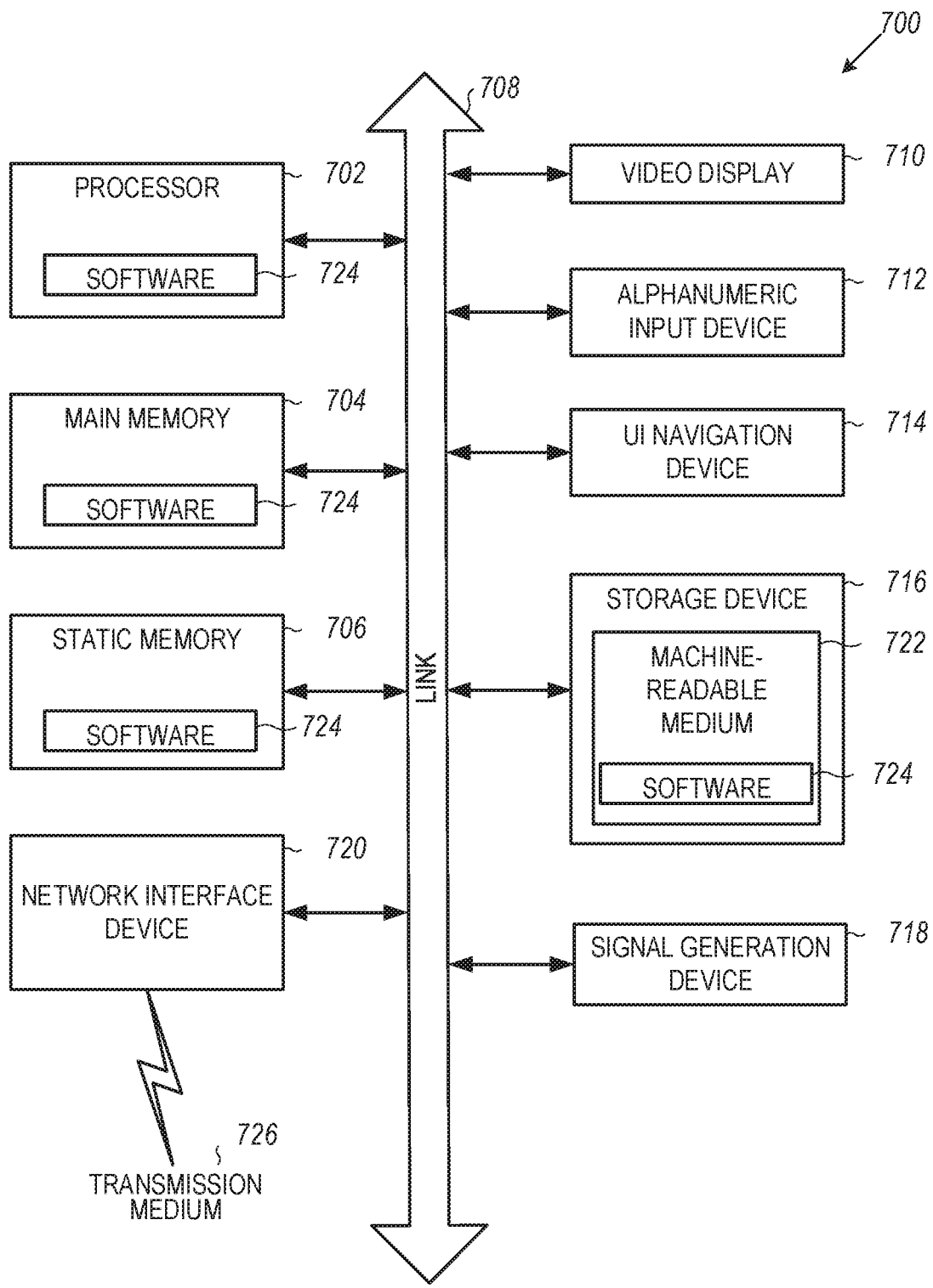
FIG. 7 is an example computing device that can be used in conjunction with the technologies described herein.

FIG. 7 is an example computing device that can be used in conjunction with the technologies described herein. In alternative embodiments, the computing device 700 may operate as a standalone device or may be connected (e.g., networked) to other computing devices. In a networked deployment, the computing device 700 may operate in the capacity of a server communication device, a client communication device, or both in server-client network environments. In an example, the computing device 700 may act as a peer computing device in peer-to-peer (P2P) (or other distributed) network environment. The computing device 700 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may perform the method of FIG. 6.

Computing device 700 may include a hardware processor 702 (e.g., a central processing unit (CPU), a graphics processing unit (GPU), a hardware processor core, or any combination thereof), a main memory 704 and a static memory 706, some or all of which may communicate with each other via a link (e.g., bus) 708. The computing device 700 may further include a display unit 710, an input device 712 (e.g., a keyboard), and a user interface (UI) navigation device 714 (e.g., a mouse). In an example, the display unit 710, input device 712, and UI navigation device 714 may be a touch screen display. In an example, the input device 712 may include a touchscreen, a microphone, a camera (e.g., a panoramic or high-resolution camera), physical keyboard, trackball, or other input devices.

The computing device 700 may additionally include a storage device (e.g., drive unit) 716, a signal generation device 718 (e.g., a speaker, a projection device, or any other type of information output device), a network interface device 720, and one or more sensors, such as a global positioning system (GPS) sensor, compass, accelerometer, motion detector, or other sensor. The computing device 700 may include an input/output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 716 may include a computing-readable (or machine-readable) storage media 722, on which is stored one or more sets of data structures or instructions 724 (e.g., software) embodying or utilized by any one or more of the techniques or functions described herein. In an example, at least a portion of the software may include an operating system and/or one or more applications (or apps) implementing one or more of the functionalities described herein. The instructions 724 may also reside, completely or at least partially, within the main memory 704, within the static memory 706, and/or within the hardware processor 702 during execution thereof by the computing device 700. In an example, one or any combination of the hardware processor 702, the main memory 704, the static memory 706, or the storage device 716 may constitute computing device (or machine) readable media.

While the computer-readable storage media 722 is illustrated as a single medium, a "computer-readable storage media" or "machine-readable storage media" may include a single medium or multiple media (e.g., a centralized or distributed database, and/or associated caches and servers) configured to store the one or more instructions 724.

In an example, a computer-readable storage media or machine-readable storage media may include any medium that is capable of storing, encoding, or carrying instructions for execution by the computing device 700 and that cause the computing device 700 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 720 may use the transfer protocols to transmit data using transitory propagating signals.

In an example, the network interface device 720 may include one or more physical jacks (e.g., Ethernet, coaxial, or phone jacks) or one or more antennas to connect to the communications network 726. In an example, the network interface device 720 may include one or more wireless modems, such as a Bluetooth modem, a Wi-Fi modem or one or more modems or transceivers operating under any of the communication standards mentioned herein. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. In an example, a transmission medium may include any intangible medium that is capable of storing, encoding or carrying instructions for execution by the computing device 700, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for approximating a softmax layer, the method comprising operations performed using an electronic processor, the operations comprising:
   constructing a small world graph comprising a plurality of nodes for a vocabulary of a natural language model (NLM);
   transforming a context vector using an inner product preserving transformation;
   searching the small world graph using the transformed context vector to identify a top-K hypothesis for a next word;
   determining a distance from the context vector for each of the top-K hypothesis;
   transforming the distance to an original inner product space;
   computing a softmax distribution for the softmax layer over the inner product space of the top-K hypothesis for the next word;
   storing the softmax distribution; and
   identifying the next word based on the top-K hypothesis.

2. The method of claim 1, wherein constructing a small world graph comprising a plurality of nodes comprises for each word in the vocabulary:
   inserting a node into the small world graph as one of the plurality of nodes;
   connecting the node to a plurality of nearest neighbor nodes;
   selecting a random long range node; and
   connecting the node to the random long range node.

3. The method of claim 2, wherein the long range node is not a nearest neighbor node.

4. The method of claim 2, further comprising:
   determining Euclidian distances between the node and other nodes within the small world graph; and
   selecting the nearest neighbor nodes based on the determined Euclidean distances.

5. The method of claim 1, wherein searching the small world graph using the transformed context vector to identify the top-K hypothesis comprises:
   storing candidate nearest neighbor nodes in a queue, wherein a size of the queue is set to a predetermined value; and
   stopping the search when a number of distance calculations reaches a predetermined count.

6. The method of claim 1, wherein the small world graph comprises a number of layers.

7. The method of claim 1, further comprising selecting the next word in a sentence from the vocabulary based on the softmax distribution, wherein the context vector is based on words prior to the next word in the sentence.

8. The method of claim 7, further comprising storing the next word.

9. A system for approximating a softmax layer, the system comprising:
   an electronic processor:
   a memory including instructions that configured the electronic processor to:
   construct a small world graph comprising a plurality of nodes for a vocabulary of a natural language model (NLM);
   transform a context vector using an inner product preserving transformation;
   search the small world graph using the transformed context vector to identify a top-K hypothesis for a next word;
   determine a distance from the context vector for each of the top-K hypothesis;
   transform the distance to an original inner product space;
   compute a softmax distribution for the softmax layer over the inner product space of the top-K hypothesis for the next word; and
   identify the next word based on the top-K hypothesis.

10. The system of claim 9, wherein to construct a small world graph comprising a plurality of nodes, the electronic processor is further configured to for each word in the vocabulary:
    insert a node into the small world graph as one of the plurality of nodes;
    connect the node to a plurality of nearest neighbor nodes;
    select a random long range node; and
    connect the node to the random long range node.

11. The system of claim 10, wherein the electronic processor is further configured to:
    determine Euclidian distances between the node and other nodes within the small world graph; and
    select the nearest neighbor nodes based on the determined Euclidean distances.

12. The system of claim 11, wherein the long range node is not a nearest neighbor node.

13. The system of claim 9, to search the small world graph using the transformed context vector to identify the top-K hypothesis, the electronic processor is further configured to:
    store candidate nearest neighbor nodes in a queue, wherein a size of the queue is set to a predetermined value; and
    stop the search when a number of distance calculations reaches a predetermined count.

14. The system of claim 9, wherein the small world graph comprises a number of layers.

15. The system of claim 9, wherein the electronic processor is further configured to select the next word in a sentence from the vocabulary based on the softmax distribution, wherein the context vector is based on words prior to the next word in the sentence.

16. The system of claim 15, wherein the electronic processor is further configured to store the next word.

17. A computer-readable storage medium storing computer-executable instructions for approximating a softmax layer, the stored instructions comprising:
    instructions to construct a small world graph comprising a plurality of nodes for a vocabulary of a natural language model (NLM);
    instructions to transform a context vector using an inner product preserving transformation;
    instructions to search the small world graph using the transformed context vector to identify a top-K hypothesis for a next word;
    instructions to determine a distance from the context vector for each of the top-K hypothesis;
    instructions to transform the distance to an original inner product space;
    instructions to compute a softmax distribution for the softmax layer over the inner product space of the top-K hypothesis for the next word; and
    instructions to identify the next word based on the top-K hypothesis.

18. The computer-readable storage medium of claim 17, wherein the instructions to construct a small world graph comprising a plurality of nodes comprises, for each word in the vocabulary:
- instructions to insert a node into the small world graph as one of the plurality of nodes;
- instructions to connect the node to a plurality of nearest neighbor nodes;
- instructions to select a random long range node; and
- instructions to connect the node to the long range node.

19. The computer-readable storage medium of claim 18, wherein the instructions further comprise:
- instructions to determine Euclidian distances between the node and other nodes within the small world graph; and
- instructions to select the nearest neighbor nodes based on the determined Euclidean distances.

20. The computer-readable storage medium of claim 19, wherein the long range node is not a nearest neighbor node.

\* \* \* \* \*